Figure 1:
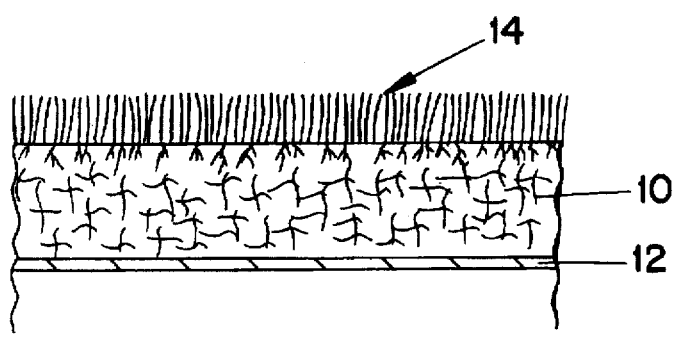

United States Patent [19]
Behrens

[11] Patent Number: 5,724,766
[45] Date of Patent: Mar. 10, 1998

[54] HYGROSCOPIC ROCK WOOL MAT OF LOW WEIGHT PER UNIT VOLUME CAPABLE OF PROVIDING IMMEDIATE LANDSCAPING TO ROOFS OR SIMILAR SURFACES

[76] Inventor: Wolfgang Behrens, Trespenmoor 25, D-27243 Gross Ippener, Germany

[21] Appl. No.: 543,009

[22] Filed: Oct. 13, 1995

[30] Foreign Application Priority Data

Oct. 13, 1994 [DE] Germany .................. 44 36 443.1

[51] Int. Cl.$^6$ ........................................ A01C 1/04
[52] U.S. Cl. ........................... 47/56; 47/59; 47/64
[58] Field of Search .................. 47/56, 665, 59 C, 47/59 CO, 83, 64, 66, 59

[56] References Cited

U.S. PATENT DOCUMENTS

| | | | |
|---|---|---|---|
| 3,863,388 | 2/1975 | Loads | 47/56 |
| 5,390,442 | 2/1995 | Behrens | 47/83 |

FOREIGN PATENT DOCUMENTS

| | | | |
|---|---|---|---|
| 0337085 | 10/1989 | European Pat. Off. | 47/83 |
| 0388287 | 9/1990 | European Pat. Off. | 47/59 C |
| 485277 | 5/1992 | European Pat. Off. | 47/56 |
| 3041534 | 6/1982 | Germany | 47/83 |
| 3708491 | 9/1988 | Germany | 47/665 |
| 3805069 | 9/1989 | Germany | 47/56 |
| 3816865 | 11/1989 | Germany | 47/56 |
| 2303421 | 12/1990 | Japan | 47/59 C |
| 4131014 | 5/1992 | Japan | 47/56 |
| 8403752 | 7/1986 | Netherlands | 47/64 |
| 1161021 | 6/1985 | U.S.S.R. | 47/59 C |
| 2106764 | 4/1983 | United Kingdom | 47/64 |

*Primary Examiner*—Terry Lee Melius
*Assistant Examiner*—Joanne C. Downs
*Attorney, Agent, or Firm*—Burns, Doane, Swecker & Mathis, L.L.P.

[57] ABSTRACT

A flexible hygroscopic mat of low weight per unit volume for the landscaping of surfaces, such as the roofs of buildings is provided. Such mat comprises a rock wool mat having a thickness of approximately 2.0 to 3.5 cm and weight per unit volume between approximately 30 and 80 kg/m$^3$ that enables it to be rolled up and living plants having roots that provide mechanical strength to the overall hygroscopic mat to form a finished product that is capable of being unrolled and applied to a roof or similar surface. The hygroscopic mat while rolled up can be readily transported to the site where it is to be installed. Also, commonly no further landscaping is required once the flexible hygroscopic mat is placed on a roof or similar surface.

15 Claims, 1 Drawing Sheet

HYGROSCOPIC ROCK WOOL MAT OF LOW WEIGHT PER UNIT VOLUME CAPABLE OF PROVIDING IMMEDIATE LANDSCAPING TO ROOFS OR SIMILAR SURFACES

The invention refers to a hygroscopic rock wool mat to be used in a plant unit for landscaping roofs and similar surfaces.

Plant units have been used for some time in order to landscape flat or pitched roofs and other surfaces to compensate against destruction of natural vegetation due to increases in the population.

In addition to the positive effects of such plant units on the environment, such as the reduction of the carbon dioxide contents of air, the production of oxygen and the generation of a balanced climate, excessive heating of buildings in summer and excessive cooling in winter will be prevented, thus improving the internal conditions in buildings by landscaped roofs.

Plant units include a growth layer containing a nutrient media to allow the growth of low and/or higher plants. This growth layer is normally a substrate and it is prior art, based on German A-Document DE 42 19 275 C2 to use hygroscopic rock wool mats instead of a substrate, with the top section of such rock wool mats being used as a growth layer. This top section will mainly support the roots of plants whilst the lower section provides positive insulation against fire, with the rock wool mat acting as a fire protection barrier.

Rock wool mats used in the past for plant units were very thick, for instance 5 cm, with a high weight per unit volume of approximately 120–140 kg/m$^3$. Although the said thick rock wool slabs allow positive fire protection by the said plant units, the use of such rock wool mats having a high weight per unit volume must be regarded as disadvantageous. These prior art rock wool mats, being a commercial product, are only available as slabs, the transport of which to the scheduled installation site, such as a roof to be landscaped, not only being expensive because of their high weight, but also unwieldy. In addition, handling of such heavy, thick rock wool slabs and installation on a roof are highly cost-intensive.

In practical application, heavy rock wool slabs are installed initially on the roof in question, followed by saturation of the rock wool with nutrients. Then seeds and plants are added for the required landscaping. In this cultivation stage landscaping work may be needed on the roof, which is another disadvantage and costly.

The invention is based on the task of generating an improved rock wool mat allowing low-cost landscaping of roofs, simultaneously maintaining the advantages of fire protection and simplifying the landscaping of such roofs.

This target is achieved by the invention by using a hygroscopic rock wool mat described in the generic term of Claim 1 by the features of the characterising parts of Claim 1.

The invention allows the creation of a novel rock wool mat characterised by two important factors. In contrast to existing mats, the rock wool mat is so thin and has a comparatively low weight per unit in volume that it is easy to handle and may be rolled up. Another important feature is the fact that this rock wool mat, which can be rolled up, has been precultivated with plants and is therefore green and available as a finished product. Due to the fact that the said landscaped rock wool mat can be rolled up and is relatively low in weight, it is easily transported to a roof for installation.

The inventive step of designing a rock wool mat as a roll-up product must be regarded as a novelty. In the past and according to the state of technology, thin rock wool mats having a low weight per unit volume have not been used and rolled up due to the possible risk of hygroscopic rock wool absorbing and/or being penetrated by moisture, thus losing its stability. A wet thin rock wool mat will tear easily when touched and rolled up. This has been repeatedly confirmed in tests by using thin, moist and wet rock wool mats.

The invention, however, eliminates the risk that a moist or wet rock wool mat would tear during mechanical handling. This is due to the fact that the thin rock wool mat having a comparatively low weight per unit volume is landscaped. It was surprisingly found that a rock wool mat will be mechanically re-enforced by the roots of plants in the sense of a mechanical re-enforcement which one could call a biological re-enforcement. The rock wool mats of the invention can therefore still be mechanically handled and rolled up when moist or wet. Precultivation of the new rock wool mats allows advantageous landscaping prior to installation on a roof for generating of a plant unit. Landscaped rock wool mats can therefore be produced beforehand and stored, being immediately available when there is a requirement to landscape a roof. Ready-landscaped rock wool mats are rolled up and easily transported to the scheduled site, to be unrolled and installed on a roof, thus making delivery and installation very cost-effective due to simple handling.

Another advantage of the invention lies in the fact that precultivated and landscaped rock wool mats may be used as such and installed on a roof as a complete plant unit, due to the rock wool mat of the invention meeting all minimum requirements in a plant unit for landscaping roofs and similar surfaces. After installation on a roof, no basic landscaping work is required.

According to a practical design of the invention, the rock wool mat has a thickness of approximately 2.0–3.5 cm, with a weight per unit volume of preferably between approximately 30 kg/$^3$ and 80 kg/m$^3$ (e.g., between approximately 30 and 50 kg/m$^3$). A thickness of approximately 3.0 cm and weight per unit volume of approximately 40 kg/m$^3$ are of particular advantage. Such a rock wool mat is comparatively light and thin and may be easily rolled up in landscaped condition.

One advantage of the rock wool mat is its carrier layer which is permeable to water, preferably consisting of a nonwoven bonded to the rock wool mat or fixed permanently in some other way to the rock wool mat.

This water-permeable carrier layer, which may be formed by a coarse mesh web, will additionally increase the mechanical strength of the rock wool mat. This ensures that the rock wool mat will not tear when rolled up or handled even under very moist and wet conditions.

Another practical design of the configuration of the invention includes a thin gravel layer or brick wire on the surface of the rock wool mat (where the wire and/or the wire mesh is coated by clay). This will make the rock wool mat heavier, thus increasing its positioning accuracy because of its increased overall weight and eliminating the risk that the rock wool mat is removed from the surface of the roof due to uplift caused by wind. In addition, plant growth is promoted in dry weather by the gravel layer, as moisture accumulating during the night will collect under the pebbles.

Figure 2:
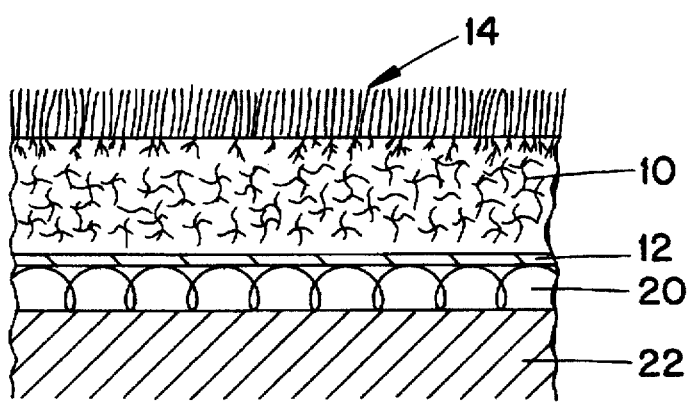

The embodiment described by means of the drawing provides a more detailed explanation of the invention, with:

FIG. 1 showing a section of a rock wool mat forming a plant unit,

FIG. 2 showing a section of a first plant unit including a rock wool mat and

Figure 3:
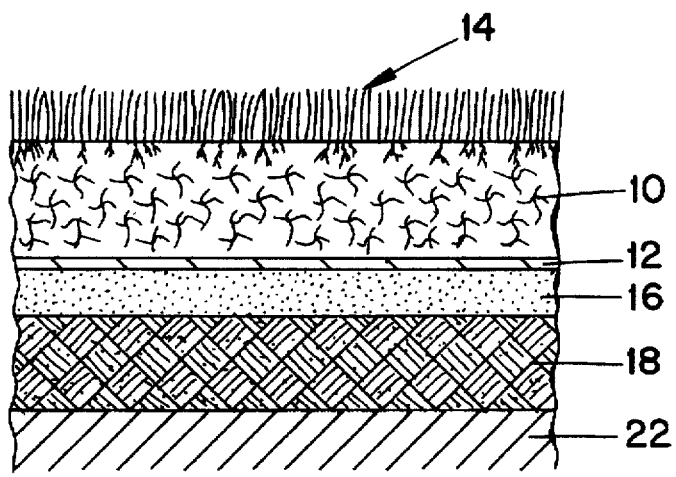

FIG. 3 showing a section of a second plant unit including a rock wool mat.

FIG. 1 shows a hygroscopic rock wool mat 10 having a bottom carrier layer 12, landscaped with plants 14. The carrier layer 12 consists of a nonwoven permeable to water or a coarse mesh and is fastened by bonding to the rock wool mat 10.

The roots of the plants 14 extend at least through the rock wool mat 10, with the said roots providing a mechanical strengthening of the rock wool mat 10 like a biological re-enforcement. The thickness of the rock wool mat 10 is preferably 3.0 cm, with a weight per unit volume of 40 kg/m$^3$. Although the rock wool mat 10 is therefore comparatively thin and light in weight, it is mechanically strengthened by its biological re-enforcement and in addition by the carrier layer 12 and can therefore be rolled up without running the risk that the rock wool mat 10 will tear during handling or whilst being rolled up.

The rock wool mat 10 described above will meet all the minimum requirements in a plant unit and can therefore be unrolled on a roof. This case has been shown as an example in FIG. 2. In order to allow the drainage of surplus water, a drainage layer 20 has been provided between the carrier layer 12 and the roof 22. On a pitched roof 22, this drainage layer 20, however, may be eliminated, if required.

FIG. 3 shows another example of a plant unit including a rock wool mat 10, again landscaped with plants 14 and including a bottom carrier layer 12. A layer containing fertiliser 16 is arranged between the carrier layer 12, with another soil layer 18 being arranged below it on the roof 22.

In addition to the feature that the landscaped rock wool mat 14 can be rolled up and therefore easily be taken to site, it offers the advantage that no landscaping is required after installation on a roof due to the rock wool mat 10 having been previously landscaped. This will eliminate failures occurring when comparatively heavy and thick rock wool slabs are installed, based on the present state of technology. These rock wool slabs are installed in their raw state, followed by landscaping with seeds, plants and fertilisation, landscaping therefore being required after installation, a very expensive job, because of the site being a roof, and often not performed with the required care and frequency. Consequently major failures have occurred, based on the present state of technology, which can be prevented by the present invention.

I claim:

1. A hygroscopic mat for providing landscaping in finished form to roofs or similar surfaces immediately upon application to said roofs or similar surfaces consisting essentially of (a) a rock wool mat having a thickness of approximately 2.0 to 3.5 cm and weight per unit volume between approximately 30 and 80 kg/m$^3$ that enable it to be rolled up and (b) living plants positioned within said rock wool mat wherein the roots of such plants provide mechanical strength to said mat to create a finished landscaping product that is capable of being readily transported in rolled form to said roofs or similar surfaces where it is unrolled and installed to provide said immediate landscaping.

2. A hygroscopic mat according to claim 1 wherein the thickness of said mat is approximately 2.0 to 3.5 cm and the weight per unit volume is between approximately 30 kg/m$^3$ and 50 kg/m$^3$.

3. A hygroscopic mat according to claim 2 that includes a bottom carrier layer that is impermeable to water.

4. A hygroscopic mat according to claim 3 wherein said bottom carrier layer is a nonwoven material.

5. A hygroscopic mat according to claim 3 wherein said bottom carrier layer is bonded to said rock wool mat.

6. A hygroscopic mat according to claim 1 wherein the thickness of said mat is approximately 3.0 cm and the weight per unit volume is approximately 40 kg/m$^3$.

7. A hygroscopic mat according to claim 6 that includes a bottom carrier layer that is impermeable to water.

8. A hygroscopic mat according to claim 7 wherein said bottom carrier layer is a nonwoven material.

9. A hygroscopic mat according to claim 7 wherein said bottom carrier layer is bonded to said rock wool mat.

10. A hygroscopic mat according to claim 1 that includes a bottom carrier layer that is impermeable to water.

11. A hygroscopic mat according to claim 10 wherein said bottom carrier layer is a nonwoven material.

12. A hygroscopic mat according to claim 10 wherein said bottom carrier layer is bonded to said rock wool mat.

13. A hygroscopic mat according to claim 1 that includes a bottom carrier layer in the form of a coarse mesh.

14. A hygroscopic mat according to claim 1 wherein a thin gravel layer is present on the upper surface of said mat which is capable of increasing the overall weight of said mat and accumulating moisture.

15. A hygroscopic mat according to claim 1 wherein a wire and/or wire mesh coated with clay is provided on the upper surface of said mat which is capable of increasing the overall weight of said mat.

* * * * *